United States Patent [19]

Cronkhite et al.

[11] Patent Number: 5,308,022
[45] Date of Patent: May 3, 1994

[54] METHOD OF GENERATING A DYNAMIC DISPLAY OF AN AIRCRAFT FROM THE VIEWPOINT OF A PSEUDO CHASE AIRCRAFT

[75] Inventors: Minton B. Cronkhite; Daniel N. Kamhis, both of San Diego, Calif.

[73] Assignee: Cubic Corporation, San Diego, Calif.

[21] Appl. No.: 373,651

[22] Filed: Apr. 30, 1982

[51] Int. Cl.$^5$ .................. F41G 7/30; B64C 13/20
[52] U.S. Cl. .................. 244/3.14; 244/190; 434/14; 434/43
[58] Field of Search .............. 244/3.14, 3.11, 189, 244/190; 434/14, 30-32, 35, 38, 43, 47

[56] References Cited

U.S. PATENT DOCUMENTS

| | | | |
|---|---|---|---|
| 3,141,634 | 7/1964 | Rhoads et al. | 244/190 |
| 3,564,134 | 2/1971 | Rue et al. | 244/3.14 |
| 3,778,007 | 12/1973 | Kearney, II et al. | 244/3.14 |
| 4,176,468 | 12/1979 | Marty, Jr. | 434/14 |

OTHER PUBLICATIONS

Reprint of article "Realtime System with Replay Capability Monitors air Combat Exercises", Computer Designs, Jan., 1981, pp. 74-86.

*Primary Examiner*—Charles T. Jordan
*Attorney, Agent, or Firm*—Brown, Martin, Haller & McClain

[57] ABSTRACT

Kinematic data is generated onboard an aircraft for describing its state of motion as it flies over a tracking range. The kinematic data is transmitted to a plurality of remote stations on the tracking range and tracking data is generated which represents the actual state vector of the flying aircraft. Also generated is pseudo tracking data, identical to the tracking data but delayed in time, for representing the motion and trajectory of a pseudo aircraft. Utilizing the pseudo tracking data an image of the flying aircraft is generated from the viewpoint of the cockpit of the pseudo aircraft. A person may then view the image to observe the dynamics of the flying aircraft as if the person were chasing the actual aircraft in the pseudo aircraft. The method permits sophisticated maneuvers in the remote piloting of aircraft as well as flight performance analysis.

6 Claims, 4 Drawing Sheets

METHOD OF GENERATING A DYNAMIC DISPLAY OF AN AIRCRAFT FROM THE VIEWPOINT OF A PSEUDO CHASE AIRCRAFT

BACKGROUND OF THE INVENTION

The present invention relates to aircraft tracking ranges and remote piloting of unmanned aircraft.

Unmanned aircraft or drones are used by the military for reconnaissance and for target practice. They incorporate onboard and remote guidance systems. Current drone tracking and control systems provide limited data to the drone pilot. In most cases only the drone X/Y position over a tracking range is provided to the pilot with a pen and ink plot board. The remotely located pilot has little idea of the state vector of the drone, and therefore he cannot perform sophisticated flight maneuvers. In addition, the drone pilot has little idea of the location, bearing, range, and dynamics of an attacking aircraft in air-to-air or ground-to-air combat training exercise. The drone is therefore an easy kill and the test or training benefit is limited.

SUMMARY OF THE INVENTION

It is therefore an object of the present invention to provide an improved method of remotely piloting unmanned aircraft.

It is another object of the present invention to provide an improved method of remotely piloting drones so that the drone pilot can make sophisticated threat representative maneuvers during air-to-air or ground-to-air combat training exercises to enhance the realism of the training.

Yet another object of the present invention is to provide an improved method of evaluating the flight performance of an aircraft.

According to the method of the present invention kinematic data is generated onboard an aircraft for describing its state of motion as it flies over a tracking range. The kinematic data is transmitted to a plurality of remote stations on the tracking range and tracking data is generated which represents the actual state vector of the flying aircraft. Also generated is pseudo tracking data, identical to the tracking data but delayed in time, for representing the motion and trajectory of a pseudo aircraft. Utilizing the pseudo tracking data an image of the flying aircraft is generated from the viewpoint of the cockpit of the pseudo aircraft. A person may then view the image to observe the dynamics of the flying aircraft as if the person were chasing the actual aircraft in the pseudo aircraft. The method permits sophisticated maneuvers in the remote piloting of aircraft as well as flight performance analysis.

DESCRIPTION OF THE PREFERRED EMBODIMENT

Figure 1:
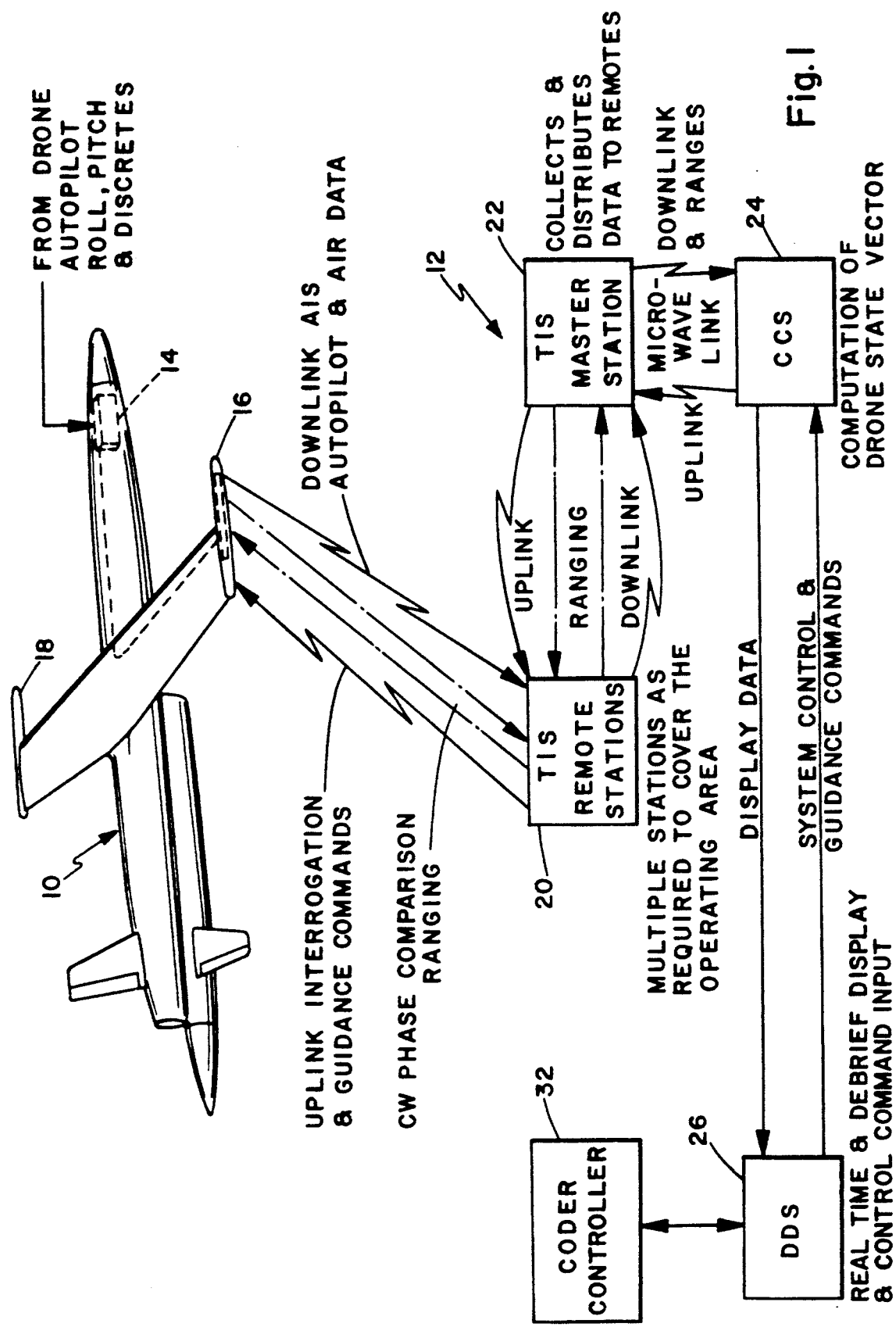
FIG. 1 is a perspective view of an airborne drone communicating with a particular type of range tracking system illustrated in block diagram form which may be utilized in performing the method of the present invention.

Referring to FIG. 1, the preferred embodiment of the method of the present invention may be performed with an unmanned aircraft 10 flying over a tracking range 12 illustrated in block diagram form. The tracking range is preferably a TACTS/ACMI system developed and manufactured by Cubic Corporation, San Diego, California, the assignee of the subject application. The term TACTS (Tactical Aircrew Combat Training System) is the designation specified by the U.S. Navy. The term ACMI (Air Combat Maneuvering Instrumentation) is the designation of the TACTS system specified by the U.S. Air Force. Both of these organizations are users of the TACTS/ACMI system. U.S. military bases where this type of range tracking system is utilized include the Marine Corps Air Station, Yuma, Ariz.; Nellis Air Force Base, Las Vegas, Nev.; Naval Air Station, Oceana, Va.; Tyndall Air Force Base, Florida; Luke Air Force Base, Arizona; and U.S. Air Force Europe, Sardinia, Italy. An overview of the electronics and software in the TACTS/ACMI system, together with a description of their operation, may be found in an article entitled "Realtime System with Replay Capability Monitors Air Combat Exercises", published in the January, 1981 edition of COMPUTER DESIGN magazine, at pages 74 through 86.

The unmanned aircraft 10 may be a NORTHROP, Ventura Division, MQM-74C CHUKAR II jet-powered target drone. The drone is approximately twelve feet long with a six foot wing span and weighs approximately four hundred and seventy five pounds. The performance of this target drone is comparable to that of a subsonic jet aircraft.

In order to perform the method of the present invention, certain modifications are made to the drone 10 and to the TACTS/ACMI tracking range 12 as hereafter described. In the conventional TACTS/ACMI system, combat aircraft such as the F15 are equipped with an AIS pod which replaces a SIDEWINDER air-to-air missile. This AIS pod generates kinematic data representing the state of motion of the aircraft. A microprocessor in the AIS pod integrates acceleration and angular rate data fed to it by an inertial sensor assembly, to thereby obtain a velocity vector and position, as well as heading, pitch and roll angles. The microprocessor transforms all kinematic data into an earth-coordinate frame of reference.

The space and weight allowances within the NORTHROP MQM-74C drone 10 are insufficient to accommodate the conventionally configured AIS pod. Therefore in order to practice the method of the present invention, a special drone AIS package 14 is installed in the nose compartment of the drone 10. The AIS package 14 replaces the standard VEGA or ITCS guidance equipment for the MQM 74C drone. The package 14 includes a TACTS/ACMI compatible transponder, power supply, and auto pilot interface. A microprocessor may serve as the auto pilot interface so that the AIS package 14 may receive roll, pitch and discrete signals from the conventional drone auto pilot.

The drone 10 is further modified by installing an airborne antenna 16 in the form of an end fed halfwave dipole. The dipole consists of a multilayer EPOXY fiberglass circuit board enclosed within a thin wall EPOXY fiberglass tube. The tube is attached to one wing tip of the drone and a bullet-shaped radome is glued to the forward end. A closed cell foam is injected into the radome and tube to encapsulate the dipole circuit board. This stabilizes the assembly and provides a water-resistant barrier. The antenna is provided with an internal series resonant circuit that provides the necessary broad-banding, enhancing the optimized VSWR. A dummy antenna 18 is attached to the opposite wing tip of the drone for aerodynamic balance.

The AIS package 14 in the drone includes a microprocessor controller which performs the same basic functions that the digital interface unit (DIU) provides for a conventional AIS P4 pod used in existing operational TACTS/ACMI systems. The microprocessor controller of the AIS package 14 receives a fourteen word serial uplink message from the transponder, keys the transmitter if the uplink contains its particular eight bit pod identification and sends a preformatted twenty-four word serial downlink data message to the drone transponder. The controller for the package 14 comprises an INTEL 8085A microprocessor, 4K bytes of program memory in EPROM, 2K bytes of data memory in RAM, five programmable LSI input/output control devices, as well as several standard digital and analog support chips. The input/output control devices include one AM9517A four-channel direct memory access (DMA) controller, one Z80SIO dual-channel serial input/output device, one AM9513 five-channel system timing controller, and two 8255A programmable peripheral interface chips. Virtually all functions of the microprocessor controller are defined by the processor's microprogram, stored as firmware in the EPROM. This program is written almost entirely in PLM80, a structured, high-level language, providing simplified user comprehension, modification and documentation compared with assembly language code.

Asynchronous with uplink data reception, the downlink message buffer is formatted by collecting analog and discrete data from the input/output devices, which interface directly to the drone's telemetry and auto-pilot control. Two downlink buffers are formatted on an alternating basis, so that at any instant at least one buffer is complete.

Serial uplink data at approximately sixty-two kbps (kilobits per second) is continuously monitored by the Z80SIO device for the proper sync pattern. When found, the processor is interrupted from the background downlink formatting task and if the drone's pod identification is selected, the processor activates the transmitter key. A DMA channel is then activated to transfer words 3-13 of uplink data, which is converted into eight-bit parallel bytes by the Z80SIO device, directly into the RAM. Another DMA channel is also enabled to simultaneously transfer words 0-23 of a complete downlink buffer to the Z80SIO device, which converts the parallel data to sixty-two kbps serial data. This data is sent to the drone's transponder for transmission to a plurality of TIS (Tracking Instrumentation Subsystem) stations 20 (FIG. 1) at geographically remote ground locations on the tracking range. At the end of the frame (ten or twenty milliseconds), the transmitter key is shut off and the background downlink processing continues where it left off.

Since uplink data can occur asynchronously with downlink processing the drone can be interrogated at any cycle rate from twenty millesconds to ten seconds. If no uplink data selecting the drone's pod identification is received for a period exceeding approximately ten seconds, a normal drone recovery sequence will begin automatically. The drone will deploy its parachute five seconds later if no valid uplink has been received.

The uplink message contains proportional pitch, roll, and discrete command data. This data is verified by an accompanying uplink checksum word, and if valid, this data is extracted, latched, and sent in parallel to the drone auto pilot control. This data will remain at the same state between uplink updates and is initialized for zero degrees pitch, zero degrees roll and discretes OFF upon power up of the drone. The uplink signal also provides the controller with frame rate and auto-respond control information. A frame rate field selects the length of the current frame and controls the amount of time the transmitter will be keyed (ten or twenty milliseconds). Auto-respond can be enabled or disabled. If enabled, an auto-respond cycle rate of approximately one-hundred to one-thousand milliseconds can be selected (in steps of one-hundred milliseconds). With auto-respond enabled, the drone will automatically key the transmitter and send a downlink message at the cycle rate selected by the last uplink. The auto-responses will occur for up to one and one-half seconds without any uplink data, after which auto-respond is disabled, but can be enabled by a new uplink. While auto-respond is active, or after it times out, downlink processing continues, so a valid updated downlink buffer is always available.

The TIS remote stations 20 each receive the downlink signals from the drone containing the kinematic data describing the drone's state of motion. These stations also generate ranging data by CW phase comparison techniques.

Range data, uplink messages and downlink messages are communicated between each of the TIS remote stations 20 and the central TIS master station 22 (FIG. 1) of the TACTS/ACMI range 12. The master station 22 collects and distributes data to the remote stations and in turn communicates through a microwave data link to the CCS (Control and Computation Subsystem) 24. The CCS is a data processing center having four PERKIN-ELMER INTERDATA 8/32D minicomputers which operate on the raw data to provide a full kinematic description of all aircraft flying over the tracking range. The CCS corrects the inertial data originating within the AIS of the drone with multilateration fixes from the TIS stations 20 to provide outputs to both the master TIS 22 and the DDS (Display and Debriefing Subsystem) 26.

Figure 2:
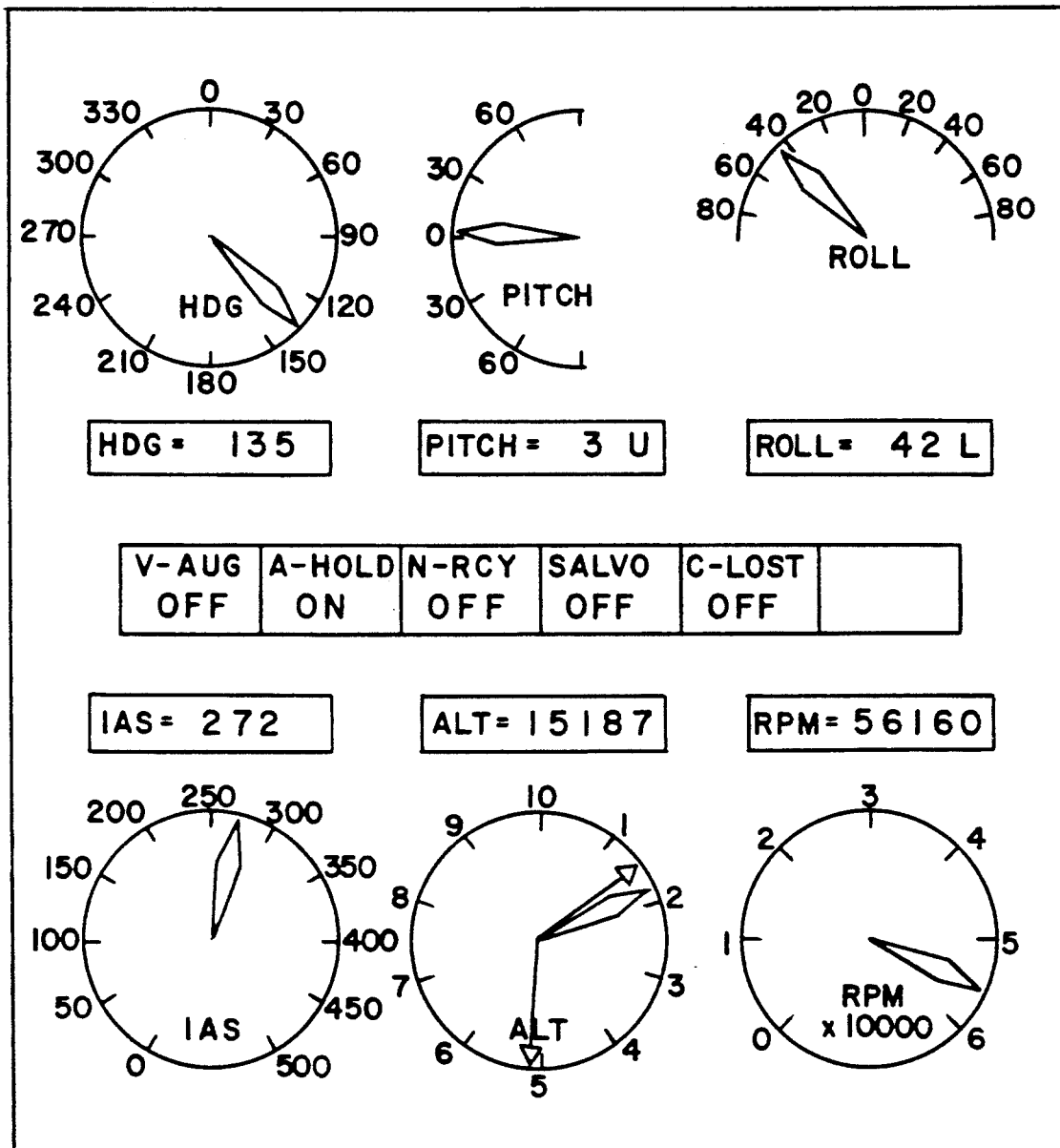
FIG. 2 illustrates the alphanumeric instrumentation display generated according to the method of the present invention.
Figure 3:
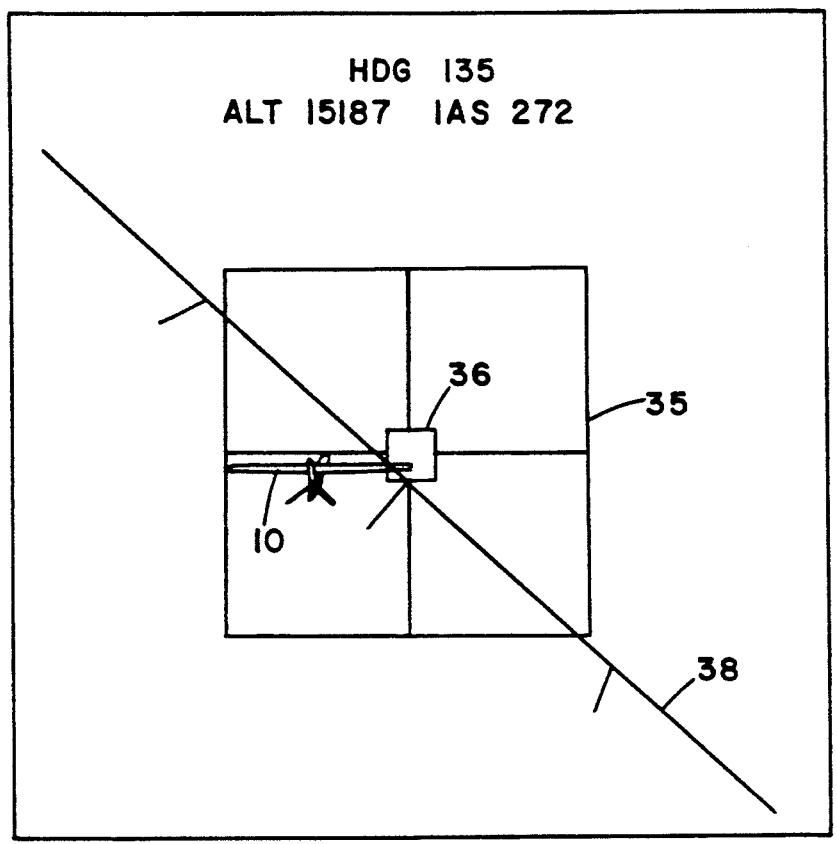
FIG. 3 illustrates the pseudo chase aircraft cockpit view generated according to the method of the present invention.

The DDS 26 uses an ADAGE GS330 display controller to operate a strokewriter CRT and color projection displays 27 (FIG. 7). Two consoles each provide a pair of twenty-one inch display screens. One screen on one console shows an image of the drone in flight in graphic form as illustrated in FIG. 3. The other screen of the same console displays tabular data relating to the performance of the drone as illustrated in FIG. 2. The two screens on the other console may be used to display an image and tabular data relating to other aircraft flying over the the tracking range.

Figure 5:
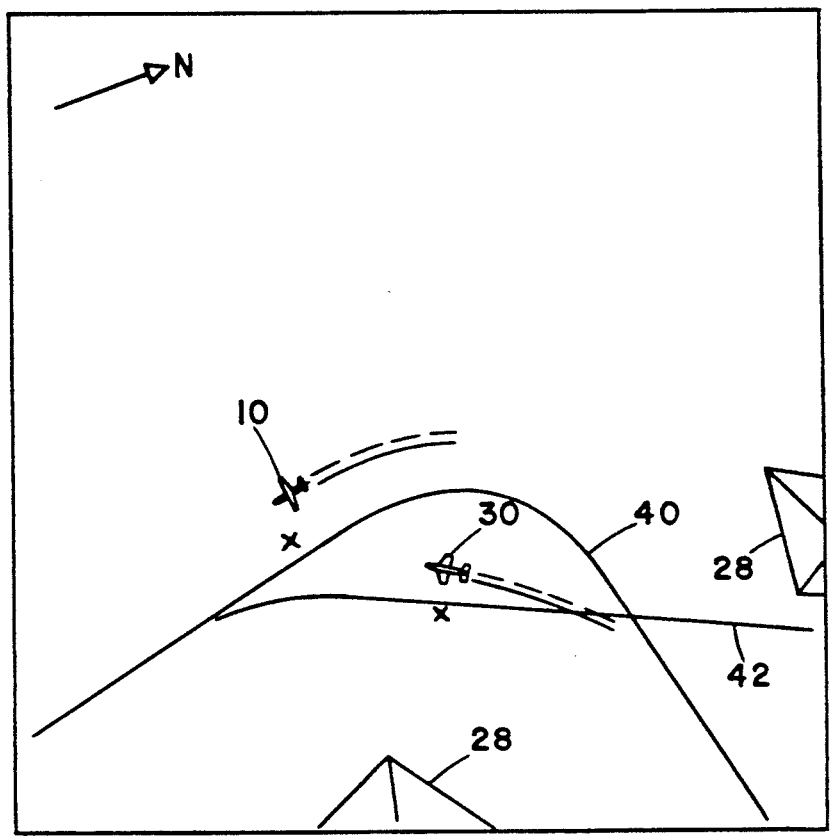
FIG. 5 illustrates a view tracking range image generated by a TACTS/ACMI range tracking system.

The system can also generate a graphic display representing a view of a portion of the tracking range, such as a square area forty nautical miles on a side. An example of such an image is illustrated in FIG. 5. This view includes not only the aerial region within the square perimeter but also ground features including three-dimensional contours of prominent hills or mountains 28 on the range. Aircraft flying within the region such as the drone 10 and an attack plane 30 appear as simplified shapes with attitudes, velocities, and locations relative to one another and to the range represented.

Figure 6:
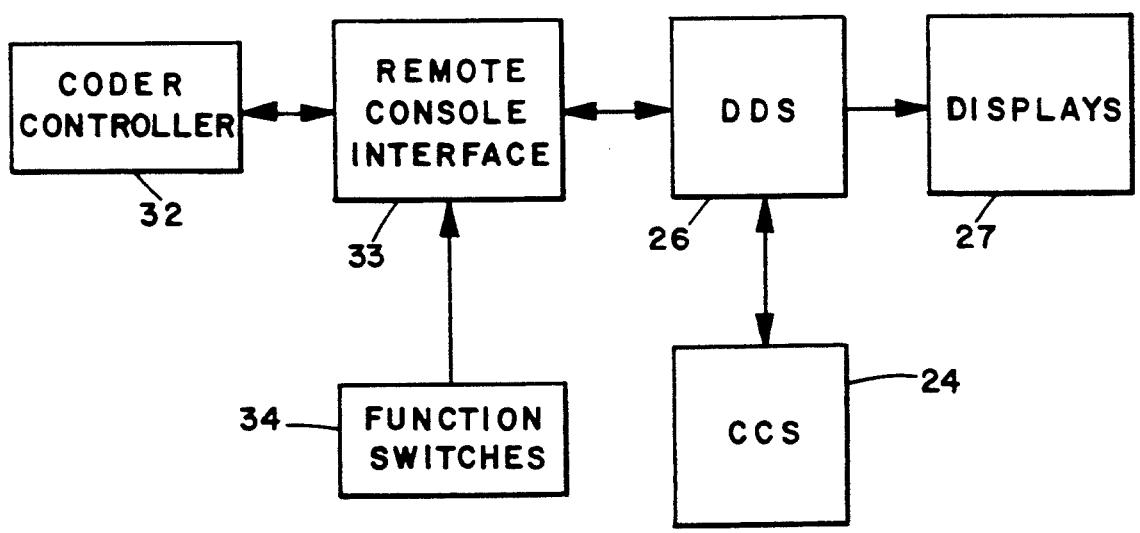
FIG. 6 is a block diagram of the drone controller interface to the DDS of the TACTS/ACMI system utilized in performing the preferred embodiment of the method.

Referring to FIG. 6, a standard ground controller unit 32, in the form of NORTHROP Part Number 58806, is connected to the DDS 26 through a console interface unit 33. The controller is operated by a pilot at the DDS console. The interface unit 33 attaches directly to the controller coder output and provides digital interface to the DDS. Pitch, roll, throttle advance, throttle retard and other discretes are interfaced. These discrete signals are used to initiate V-AUG, A-HOLD, N-RCY, and SALVO functions hereafter described. In addition, function switches 34 are provided to control the displays.

The CCS 24 (FIG. 1) calculates tracking data representing the state of motion of the drone as well as the trajectory thereof. This involves the computation of a drone state vector using information received from the TIS remote stations 20 through the TIS master station 22. The normal CCS software is modified to provide the special interfaces necessary for communication between the DDS 26 and the drone AIS package 14, and between the tracking filter of the CCS and the drone. The CCS is capable of simultaneously processing data from the drone and other aircraft flying over the tracking range.

The CCS/TIS interface module TMPYMA (XEC CPU) in the software is modified to process drone downlink data for aircraft #1. Analog RPM, analog airspeed, drone status discretes and the uplink parity error status bit are transferred to the database for transmission to the DDS. Baro-altitude, pitch and roll are set up for the special drone filter. The eight bit analog RPM is scaled by 17.481 and rounded up. The eight bit airspeed is scaled by 2.988 for transmissions to the DDS. Baro-altitude is set in item IQUATB, pitch is set in item IQUATC, roll is set in item IQUATD and item IQUATA is cleared for the drone filter.

Uplink processing for the drone includes packing pitch, roll and drone command discretes from the DDS, sending fixed values for auto respond cycle rate (1=100 milliseconds) auto respond control 01=auto enabled), and frame rate control (01=20 milliseconds), setting next interrogator for the TIS, pod identification (253) and calculating the uplink checksum word.

The CCS/DDS interface module DINUXY (XEC CPU) in the software is modified to accept and process drone command discretes, pitch, and roll from the DDS in the status message. This data is placed in the database for later uplink processing. The CCS/DDS interface module DOTUXY (XEC CPU) in the software is modified to pack DRONE discretes, analog RPM (scaled), analog air speed (scaled) and an uplink parity error status bit in the maneuver data message block for aircraft #1, assumed to be the drone. DRONE —specific items DRROLL, DRPITCH, UPE, DDCNTRL, ANAPRM and DRONDSC are added to the database YUMADB (all CPUs) for data transfers between modules. File BLOCK.FTN (FIL CPU) is modified for the phase delays for the DRONE pod ID 253. Module DSCESYMA (SIM CPU) is modified to load in database DRONE DB. All the above programs are on the operational Yuma disk pack YUGI at the Yuma, Ariz. TACTS.

In order to practice the method of the present invention, a Kalman filter program is utilized to produce complete airborne vehicle state output without the need for inertial data for short term accuracy. This drone filter has available to it the normal TACTS/ACMI phase comparison loop ranges, plus drone auto pilot roll and pitch, and drone baro-altitude. The outputs of this drone filter are position, velocity, and attitude such that the DDS displays may be driven the same as in normal TACTS/ACMI operation.

The drone filter is a Kalman filter whose state vector is the three position components, the three velocity components and the three acceleration components which are relative to an East-North-Up tangent plane coordinate frame. The Kalman filter provides estimates of the elements of the state vector at the current time based upon all past measurements. However, the Kalman filter is a recursive filter in that the present estimate is a linear combination of the previous estimate extrapolated to the present time and the current measurement set. Hence, the need for storing past measurements is eliminated and a growing filter memory is avoided. The Kalman filter for the drone is an unbiased, minimum variance, consistent estimator. That is, the estimate's statistical mean (expected value) is that of the physical quantity being estimated, the error variance is less than or equal to that of any other unbiased estimate, and the estimate converges to the true value as the number of measurements increase. Finally, the drone Kalman filter is optimal according to the criteria of optimality which minimizes the length of the estimation error vector.

The drone Kalman Filter integrates into the ten state Kalman filter in the CCS of the TACTS, utilizing as much as code in common as possible and by placing code peculiar to the drone in dedicated subroutines.

The conventional TACTS/ACMI DDS software is modified to:

1) accept roll, pitch and discrete inputs from the drone controller digital interface unit;

2) transmit these inputs to the CCS via the status message; and 3) enhance control operations with a number of drone-specific displays.

One of the aforementioned displays is an alphanumeric instrumentation display illustrated in FIG. 2. The components of the aircraft state vector and telemetry including heading (HDG), pitch, roll, indicated airspeed (IAS), altitude (ALT) and RPM are shown in the form of graphic representations of dials whose needles indicate the parameter values by their angular positions. In addition, adjacent to each of the dials is a numerical indication of the value of the parameter. Between the dials are a number of graphic indications of whether the drone is receiving certain discrete signals activated through the coder controller 32.

The designation V-AUG OFF in FIG. 2 indicates that the drone has not received a visual augmentation command. Such a command is sent by the pilot in order to cause the drone to make smoke so that it may be more easily observed. The designation A-HOLD ON indicates that the drone has received the discrete signal commanding its autopilot altitude hold to operate. The drone will thus fly at constant altitude under autopilot control. The designation N-RCY OFF indicates that the drone has not received the discrete signal commanding normal recovery. When this command is sent, the engine will shut off. Thereafter the drone will go into a ten degree climb, and then its parachute will be deployed so that the drone may be recovered. The designation SALVO OFF indicates that the discrete signal commanding instantaneous recovery has not been received by the drone. When this command is sent, the engine shuts off, drone climbs and parachute deployment occurs simultaneously, instead of in sequence as would occur when the N-RCY command is sent. Finally, the designation C-LOST OFF indicates that the drone is still receiving data uplink signals from the TIS remote stations. When the designation C-LOST ON appears, it indicates that uplink data is not being received by the drone. After ten seconds of no data, the drone automatically executes the SALVO command so that it may be recovered.

Another display which may be shown on one of the screens of the DDS is illustrated in FIG. 3. Pseudo tracking data, identical to the tracking data for the flying drone, but delayed a predetermined amount of time, is generated for representing the state vector of a pseudo aircraft. Utilizing this pseudo tracking data, the DDS generates on one of its screens an image of the flying drone 10 from the viewpoint of the cockpit of the pseudo aircraft. This permits a person to view the dynamics of the flying drone as if the person were chasing the drone in the pseudo aircraft. The cross-hair pattern 35 represents the cockpit of the pseudo chase aircraft.

In the display of FIG. 3, the movements and actions of the drone are in real time. This type of display has a number of advantages when related to the boresight 36 and horizon 38 of the pseudo chase aircraft which are also indicated as part of the display. The attitude of the drone is apparent, as well as its heading. If the drone image is above the horizon 38 of the pseudo chase aircraft, the drone is climbing, and vice versa. The amount that the drone image is left or right (earth related) of the pseudo chase aircraft bore sight is a function of the turn rate of the drone. The angle of attack of the drone is also apparent. The size of the drone image 10 is a function of its speed since the pseudo chase aircraft position delay is a fixed time, for example one second, and not a fixed distance.

Pursuant to the method of the present invention, the DDS can generate two versions of the display in FIG. 3. According to the first version, the pseudo chase aircraft cockpit view apparent attitude follows that of the flying drone in all angular rotations. In a second version, the apparent attitude of the pseudo chase aircraft is fixed at zero degrees in pitch and roll, but the heading of the pseudo chase aircraft is allowed to follow that of the drone, but delayed in time. In the second version, the actual dynamics and state of the drone in earth coordinates, may be more readily determined and quantified.

In FIG. 3, the drone is in a constant left turn, and is descending slightly, as the line of sight from the drone image to the cross-hair pattern 35 of the cockpit of the pseudo chase aircraft is slightly below the horizon 38. The angle of attack of the drone is somewhat positive as the boresight 36 of the pseudo chase aircraft is above the line of sight and the drone image is also skewed with respect to the line of sight. The heading, altitude and indicated airspeed of the drone are presented at the top of the display in FIG. 3.

A pilot seated at one of the DDS consoles may simultaneously observe the alpha numeric instrumentation display of FIG. 2 and the psuedo chase aircraft display of the drone in FIG. 3 on side by side screens. He can then readily pilot the drone using the controller 32. The flight performance characteristics of the drone are readily apparent. The DDS can also generate an image of a selected portion of the tracking range as illustrated in FIG. 5. The drone pilot can thus observe an impending attack aircraft 30. The drone pilot can make sophisticated threat responsive maneuvers during an air-to-air combat training exercise to thereby inhibit the attacker's ability to score a kill by firing a weapon. Such evasive maneuvers performed by the drone enhance the realism of the training for the pilot of the attack aircraft 30.

In FIG. 5, the attack aircraft 30 is approaching the drone 10. The display is rotated to a vertical viewing angle of about sixty degrees so that the ground track X's for each aircraft are shown below their images. The continuous lines 40 and 42 represent the preplanned flight path of the drone. The solid trail after each aircraft indicates the recent path of its left wing tip, while the dashed trail indicates the recent path of the right wing tip.

Figure 4:
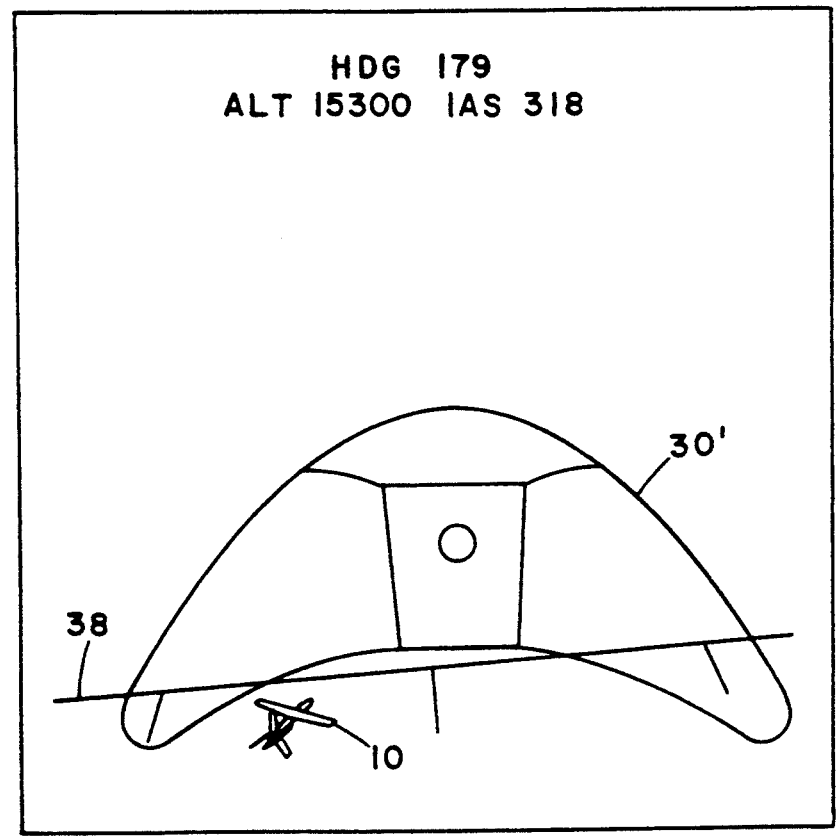
FIG. 4 illustrates the attack aircraft cockpit view of another aircraft generated in a conventional manner by a TACTS/ACMI range tracking system.

FIG. 4 illustrates a conventional TACTS/ACMI display in the DDS showing the image of the drone 10 as seen from the cockpit of the attack aircraft 30 which is equipped with a conventional AIS pod. The cockpit of the attack aircraft is illustrated in FIG. 4 by the reference numeral 30'. In FIG. 4, both the drone 10 and the attack plane 30 are displayed in real time. The display of FIG. 4 is similar to those heretofore generated in the conventional TACTS/ACMI system where two AIS pod equipped aircraft are engaged in simulated air-to-air combat. It should be understood that the displays of FIGS. 3-5 are animated. In other words, the aircraft images as well as other graphic representations move and rotate as they are continuously updated.

Having described a preferred embodiment of the method for generating a dynamic display of an aircraft from the viewpoint of a pseudo chase aircraft, it should be apparent to those skilled in the art that our invention may be modified in both arrangement and detail. Therefore the protection afforded our invention should be limited only in accordance with the scope of the following claims.

We claim:
1. A method of generating a dynamic display of an aircraft in flight, comprising the steps of:
generating kinematic data onboard the flying aircraft describing its state of motion;
transmitting the kinematic data to at least one station on a tracking range and generating tracking data representing the actual state vector of the flying aircraft;
generating pseudo tracking data, identical to the tracking data but delayed in time, for representing the state vector of a pseudo aircraft; and
generating from the pseudo tracking data an image of the flying aircraft from the viewpoint of the cockpit of the pseudo aircraft whereby a person may view the dynamics of the flying aircraft as if the person were chasing the aircraft in the pseudo aircraft.

2. A method according to claim 1 and further comprising the step of generating an alphanumeric display of selected components of the aircraft state vector and aircraft telemetry data.

3. A method according to claim 2 and further comprising the steps of:

transmitting to the aircraft guidance commands from a person viewing the aircraft image and the alphanumeric display; and receiving the guidance commands onboard the aircraft and modifying the state vector of the aircraft in accordance therewith.

4. A method according to claim 1 wherein the image is that resulting from the pseudo aircraft following the flying aircraft state vector in all angular rotations.

5. A method according to claim 1 wherein the image is that resulting from the pseudo aircraft state vector being fixed at zero degrees in pitch and roll but following the heading of the flying aircraft.

6. A method according to claim 1 and further comprising the step of generating an image of the tracking range with an image of the flying aircraft and any other actual aircraft indicated thereon at their actual locations.

* * * * *